United States Patent [19]

Denaro

[11] Patent Number: 5,031,282
[45] Date of Patent: Jul. 16, 1991

[54] BINDING STRAP

[76] Inventor: Douglas A. Denaro, R.R. 2, Box 5, Trenton, Ill. 62293

[21] Appl. No.: 569,558

[22] Filed: Aug. 20, 1990

[51] Int. Cl.$^5$ .............................................. B23B 45/00
[52] U.S. Cl. ...................... 24/16 R; 24/304; 24/306; 24/442; 248/51; 248/205.2; 279/1 K; 408/241 R
[58] Field of Search .............. 24/16 R, 16 PB, 442, 24/306, 304; 248/51, 52, 205.2; 279/1 K; 128/DIG. 115; 2/DIG. 16; 408/241 R; 81/16; 439/501

[56] References Cited

U.S. PATENT DOCUMENTS

| | | |
|---|---|---|
| 2,880,008 | 3/1959 | Stoner . |
| 3,383,738 | 5/1968 | Fox et al. ................... 2/DIG. 6 |
| 4,068,978 | 1/1978 | Brock . |
| 4,111,079 | 9/1978 | Derbyshire . |
| 4,182,005 | 1/1980 | Harrington . |
| 4,186,933 | 2/1980 | Derbyshire . |
| 4,558,495 | 12/1985 | Olsen ........................... 408/241 R |
| 4,631,783 | 12/1986 | Hayashi . |
| 4,700,432 | 10/1987 | Fennell . |
| 4,759,963 | 7/1988 | Uso, Jr. et al. . |
| 4,815,172 | 3/1989 | Ward . |
| 4,893,381 | 1/1990 | Frankel . |

FOREIGN PATENT DOCUMENTS 302230 10/1965 Netherlands ........................ 279/1 K Primary Examiner—James R. Brittain
Attorney, Agent, or Firm—Robbins & Robbins

[57] ABSTRACT

A binding strap for holding the coiled cord of an electrical tool is provided. The binding strap is comprised of an elongate strap with Velcro connecting material on opposite faces. The end of the strap is split into a top flap and a bottom flap to receive and permanently affix an electrical cord of a power tool. The strap bends back over itself to encircle and secure by mating Velcro attachment the coiled cord of the power tool for convenience in storage. Further embodiments provide for retaining a drill chuck key at the free end of the strap.

15 Claims, 2 Drawing Sheets

BINDING STRAP

BACKGROUND OF THE INVENTION

This invention relates to binding straps used for securing coiled cords of power tools and the like and for retaining drill chuck keys.

There is an inherent problem in power tools of keeping the power cord neatly coiled when the tool is not in use. The operator might use tie stays, individual pieces of string, or anything else which holds the coils together. If these means are not handy, the cord may be tied back upon itself. None of these methods are very efficient.

Means for securing the coiled cord using Velcro strap attachments are known. This type is the most efficient because no tying is required. All that is needed is to bend the strap back over itself and place the mating Velcro surfaces next to one another and attachment is effected, with the coiled cord being held within the enclosure of the strap. The only problem that arises is ensuring that the Velcro strap is readily at hand when the time comes for coiling the cord. There is thus a need or providing a Velcro strap attachment that is permanently affixed to the cord for quick use.

Another problem that exists with power drills is the need for constant use of the chuck key when the drill bit must be changed. Although many holders exist for securing chuck keys within easy reach of the drill, the chuck keys generally fit loosely and may slip out and become lost.

Accordingly, there is a need for a power tool cord binder having Velcro attachment means for holding together a coiled cord, with the binder being permanently fixed to the power cord and further having means to securely hold a drill chuck key within close reach for an operator to use on the drill chuck when necessary.

SUMMARY OF THE INVENTION

By mean of the instant invention there has been provided a binding strap comprising an elongate flexible strap having mating Velcro attachment material on both sides. The strap has one end that is split to form a top flap and a bottom flap between which the power cord may be placed for permanent affixation. The stap is provided with holes at the end to receive rivets to close the flaps together around the cord. The strap is designed to bend back over itself, enclosing the coiled cord, bringing the opposite sides in engagement with each other to effect Velcro attachment.

Other embodiments provide for means for permanently securing a drill chuck key at the other end of the stap. The other end is also split into top and bottom flaps which receive the chuck key therebetween. The flaps are provided with holes to accept rivets so that the flaps may be secured together around the chuck key.

It is therefore an object of this invention to provide a binding strap having Velcro attachment means which may be permanently affixed to the power cord, with the binder being able to bend back over itself to enclose the coiled wire.

It is further an object of this invention to provide a binding strap having means to permanently secure at its free end a drill chuck key for ready use by the operator.

IN THE DRAWINGS

DESCRIPTION OF THE INVENTION

The binding strap of the instant invention is generally indicated by the numeral 10. It is comprised of a flexible strap member 12 made of cloth or plastic having a top surface 13 completely covered with the hook fastening material sold typically under the trademark Velcro and a bottom surface 15 completely covered with the correspondingly mating loop fastening Velcro material. The Velcro material is described in U.S. Pat. Nos. 2,717,437; 3,000,384 and 3,096,235 and form no part of the invention per se. It is understood that the placement of the hook and loop fastening material on either the top or the bottom surface of the strap may be interchangeable so long as a mating connection may take place between the top and bottom surface.

Figure 1:
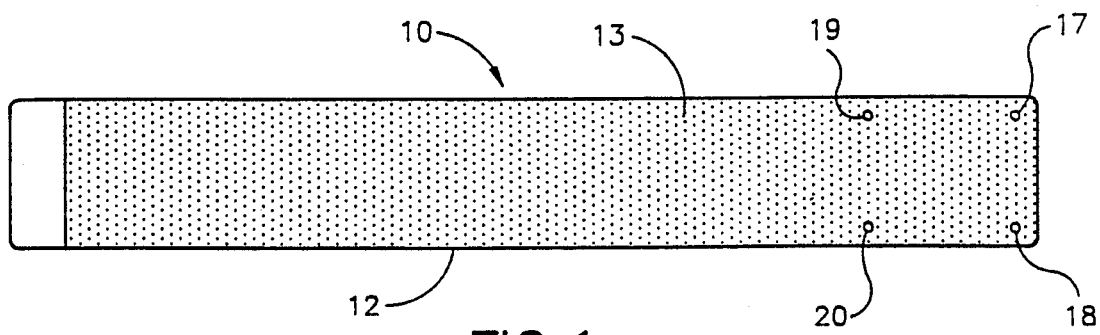
FIG. 1 is a top plan view of the cord binding strap without means for receiving a chuck key.
Figure 2:
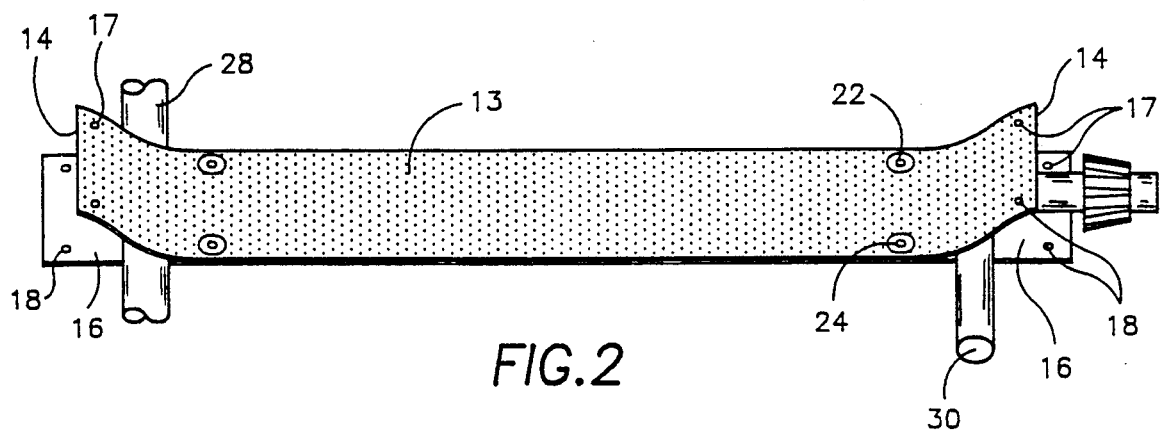
FIG. 2 is a perspective view of the strap with means for receiving a chuck key.

Each end of the strap is split along its horizontal plane for a short distance to provide a top flap 14 and a bottom flap 16 as shown in FIG. 2. Each end also is provided with a series of four holes such as 17, 18, 19 and 20 as shown in FIG. 1. Holes 17 and 18 are located at the corners of the strap and holes 19 and 20 are placed at a position on the strap where top flap 14 bottom flap 16 are rejoined. Holes 17, 18 19 and 20 receive rivets, such as 22 and 24 shown in FIG. 3, for securing top flap 14 and bottom flap 16 around an object. Stitching means 26 may be substituted for holes 20 and 19 as a means for preventing further splitting of the strap along its horizontal plane. If it is desired to merely secure a coiled cord, line hose or the like which do not use chuck keys, a simpler embodiment provides for only one end to be split into top and bottom flaps.

The binding strap of the instant invention is very simply employed for permanent attachment to an electrical cord of a power tool or other hose-type lines and the like where it may be readily used for securing the coiled cord or line in a net and orderly fashion. The cord 28 is placed between top flap 14 and bottom flap 16 which are secured together around the cord by fastening rivets through the provided holes as shown in FIG. 2. Adhesive means are provided on the respective interior surfaces of top flap 14 and bottom flap 16 to effect a greater seal around cord 28.

Figure 3:
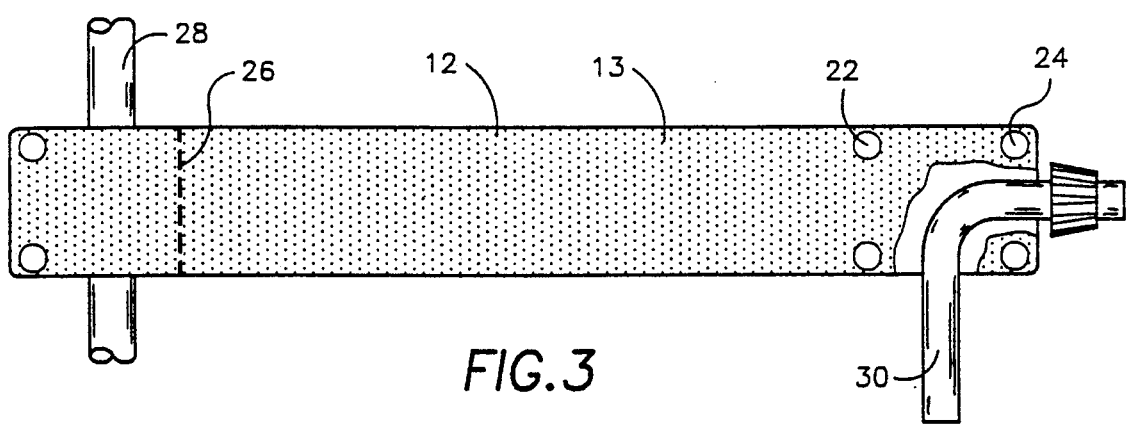
FIG. 3 is a top plan view of the strap as fastened to an electrical cord and a drill chuck key.

Binder strap 10 receives a drill chuck key 30 in similar fashion, the key being secured between the top and bottom flaps 14 and 16, respectively. The key is positioned so that the body of the key lies in the same plane as strap 12 as shown in FIG. 3. The flaps are secured together by fastening rivets through holes 17, 18, 19 and 20. Adhesive means are provided on the interior surfaces of the flaps. The binding strap of the instant invention is adapted to receive various configurations of drill chuck keys, such as those having an L-shape, T-shape and the like.

Figure 4:
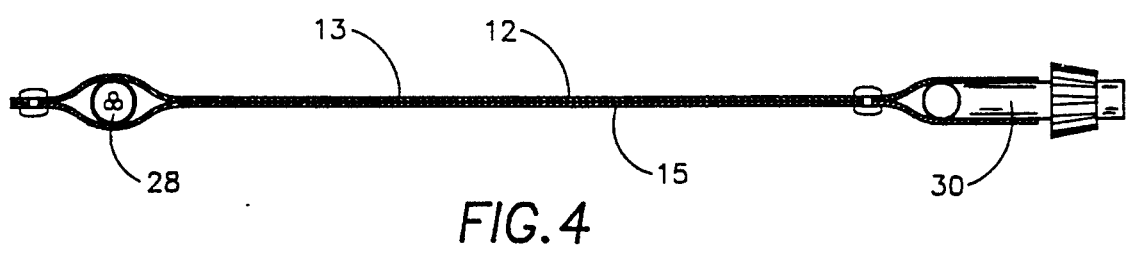
FIG. 4 is a cross sectional view in side elevation from the side of the strap of FIG. 3.
Figure 5:
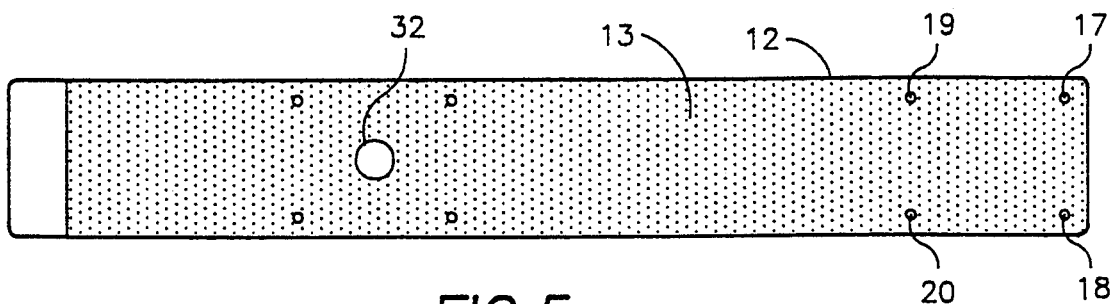
FIG. 5 is a top plan view of another embodiment of the binding strap.
Figure 6:
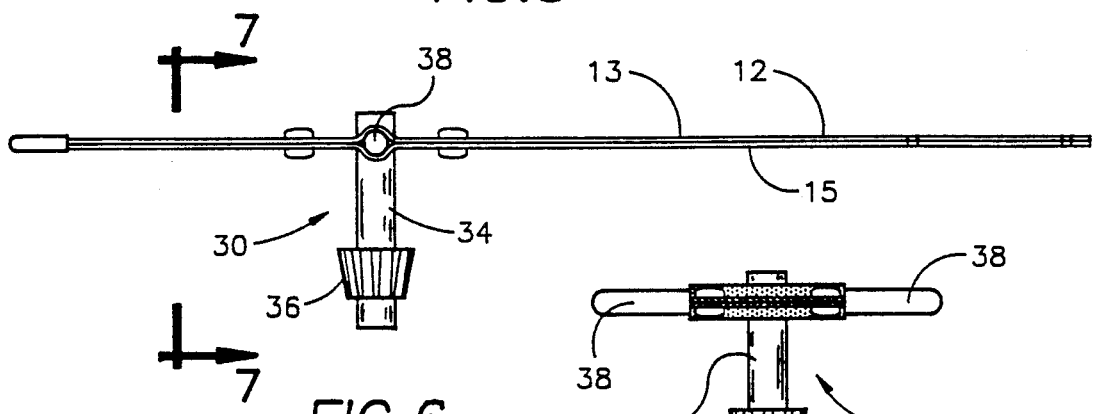
FIG. 6 is a cross-sectional view in side elevation of the strap taken from line 6—6 of FIG. 5.
Figure 7:
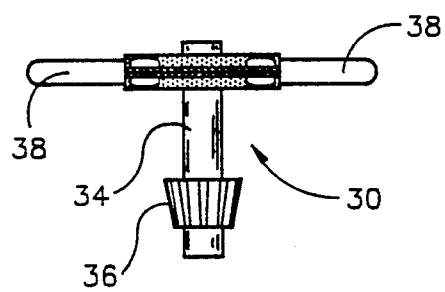
FIG. 7 is a perspective view of the binding strap as affixed to the electrical cord of a power tool and receiving a drill chuck key.
Figure 8:
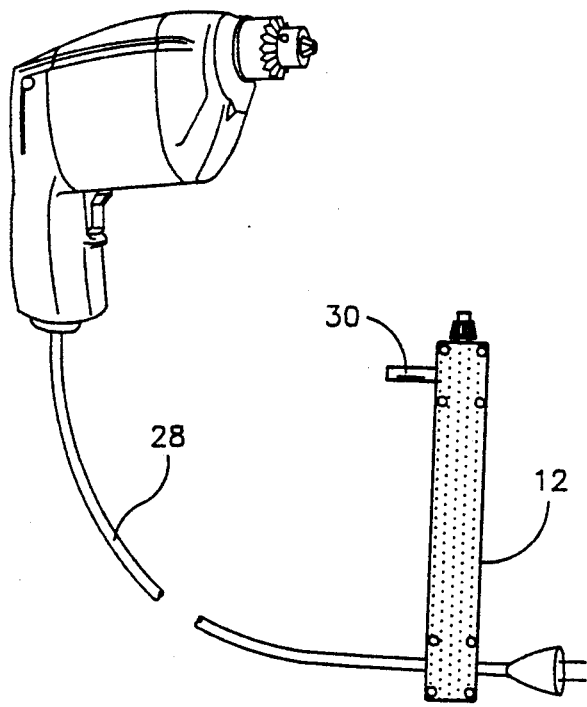
FIG. 8 is a perspective view of the strap secured to the cord of a power tool.

Another embodiment of the binding strap for receiving a chuck key is shown in FIGS. 5 and 6 which provides for the body of the chuck key to be positioned perpendicularly to the strap. An aperture 32, of sufficient dimension to recieve the drill chuck body 34, is positioned at the center on the area defined by holes 17, 18, 19 and 20. The material of the strap 12 is resilient to allow for expansion of aperture 32 so that chuck key head 36 may pass through when inserting the chuck key. Strap 12 may be split at the end to receive the chuck key as in FIGS. 2 through 4 for this embodiment, or may be split along the horizontal plane a short distance away from the end of the stap as shown in FIGS. 5 and 6. This embodiment is used for chuck keys having a T-shape, so that the arms 38 of the key are held between the top bottom portion of the strap. The top and bottom portions must be pulled apart and twisted slightly out to receive the arms 38 of the key therebetween. Holes 17, 18, 19 and 20 are fastened together by rivets, and adhesive means are provided on the interior surfaces of the top and bottom for a tighter seal in securing the chuck key.

Figure 9:
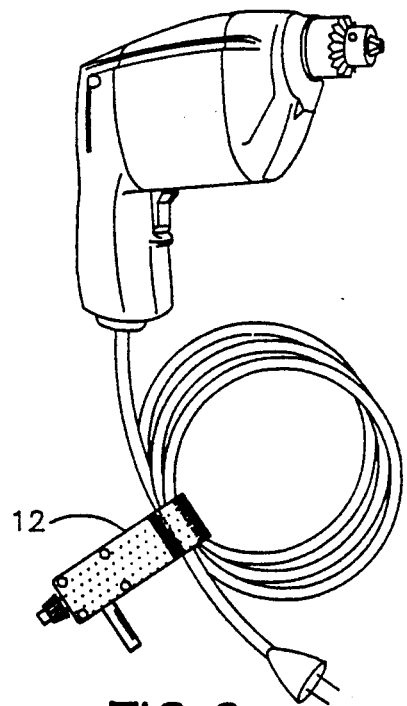
FIG. 9 is a perspective view of the strap securing the coiled cord of the power tool.

The binding strap is very simply employed to secure a coiled cord or line in that the strap is merely bent back over itself, enlosing the cord or line therein, so that the top and bottom surfaces lined with the Velcro material engage and hold together as shown in FIG. 9. Although use with the electrical cord of a power tool having a chuck key was discussed here, it is to be understood that the binding strap of the instant invention may be used in other applications where a coiled cord or line should be secured and where a key element is employed, such as with the gas lines of oxygen tanks.

Various changes and modifications may be made within this invention as will be apparent to those skilled in the art. Such changes and modifications are within the scope and teaching of this invention as defined in the claims appended hereto.

What is claim is:

1. A binding strap comprising an elongate strap having opposite faces, one of said faces being formed with fibrous loop fastening material and an other of said faces being formed with hook fasteners, said strap having two ends, one of said ends being split along the plane of said strap for a short distance to form a top flap and a bottom flap and having means to prevent further splitting, and said split end having two holes disposed through said top flap and bottom flap at the transverse edge, whereby said split end can fixedly receive and electrical cord of a power tool, said cord being placed between said top flap and bottom flap transversely to said strap, said top flap and bottom flap being secured together around said cord by fastening rivets through said holes, said strap being flexible whereby it bends back over itself to hold a collected coil of said cord, said hook fasteners engaging said fibrous loop fastening material.

2. The binding strap of claim 1 in which said means to prevent futher splitting comprises said strap having two additional holes placed in alignment along a position transverse to said strap at the location where said end splits, said additional holes receiving fastened rivets.

3. The binding strap of claim 1 in which an inside face of each of said top flap and bottom flap has adhesive means whereby said top flap and bottom flap can be secured together in tight relationship around said cord.

4. The binding strap of claim 1 in which said means to prevent further splitting comprises said strap having two additional holes placed in alignment along a postion transverse to said strap at the location where said end splits, said additional holes receiving fastened rivets and an inside face of each of said top flap and bottom flap has adhesive means whereby said top flap and bottom flap can be secured together in tight relationship around said cord.

5. A binding strap comprising an elongate strap having opposite faces, one of said faces being formed with fibrous loop fastening material and an other of said faces being formed with hook fasteners, said strap having two ends, at least one of said ends being split along the plane of strap for a short distance to form a top flap and a bottom flap and having means to prevent further splitting, and said at least one end having two holes disposed through said top flap bottom flap at the transverse edge, whereby at least one of said ends can fixedly receive an electrical cord of a power tool, said cord being placed between said top flap and said bottom flap transversely to said strap, said top flag and bottom flap being secured together around said cord by fastening rivets through said holes, a second of said ends being split along the plane of said strap for a short distance to form a top portion and a bottom portion, said top and bottom portion receiving therebetween a drill chuck key in retaining relating, said strap being flexible whereby it bends back over itself to hold a collected coil of said cord, said hook fasteners engaging said fibrous loop fastening material.

6. The binding strap of claim 5 in which said second end is split along the plane of said strap for a short distance to form a second top flap and a second bottom flap thereby defining said top and bottom portions respectively and having a second means to prevent further splitting, and said second end having two additional holes disposed through said second top flap and second bottom flap at the transverse edge, whereby said second end can receive a drill chuck key in retaining relation, said drill chuck key being placed between said second top flap and said second bottom flap in a manner so that said drill chuck key extends collinearly from said strap.

7. The binding strap of claim 6 in which at least one of said means to prevent further splitting comprises said strap having two further holes placed in alignment along a position transverse to said strap at the location where one of said ends splits, said further holes receiving fastened rivets.

8. The binding strap of claim 6 in which an inside face of each of said second top flap and second bottom flap has adhesive means whereby said second top flap and second bottom flap can be secured together in tight relationship around said drill chuck key.

9. The binding strap of claim 6 in which said second means to prevent further splitting comprises said strap having two further holes placed in alignment along a position transverse to said strap at the location where said second end splits, said further holes receiving fastened rivets and an inside face of each of said second top flap and second bottom flap has adhesive means whereby said second top flap and second bottom flap can be secured together in tight relationship around said drill chuck key.

10. The binding strap of claim 5 in which said second end is split along the plane of said strap for a short distance to form a second top flap and a second bottom flap thereby defining said top and bottom portions respectively and having a second means to prevent further splitting, said second end having two additional holes disposed through said second top flap and second bottom flap at the transverse edge and further having an aperture located in the center of said second top and second bottom flap, whereby said second end can receive a drill chuck key in retaining relation, said drill chuck key having a longitudinal body being placed through said aperture of said second top flap and said second bottom flap in a manner so that said drill chuck key is positioned transversely to said strap, said drill chuck key having a handle being secured between said second top and bottom second flaps.

11. The binding strap of claim 10 in which at least one of said means to prevent further splitting comprises said strap having two further holes placed in alignment along a position transverse to said strap at the location where one of said ends splits, said further holes receiving fastened rivets.

12. The binding strap of claim 10 in which an inside face of each of said second top flap and second bottom flap has adhesive means whereby said second top flap and second bottom flap can be secured together in tight relationship around said drill chuck key handle.

13. The binding strap of claim 10 in which said second means to prevent further splitting comprises said strap having two further holes placed in alignment along a position transverse to said strap at the location where said second end splits, said holes further receiving fastened rivets and an inside face of each of said second top flap and second bottom flap has adhesive means whereby said second top flap and second bottom flap can be secured together in tight relationship around said drill chuck key handle.

14. The binding strap of claim 5 in which said second end is split along the plane of said strap for a short distance thereby defining said split in said second end, said split in said second end restricted from continuing to the transverse edge of said second end, said split in said second end forming said top portion and said bottom portion of said strap and having an aperture within said top portion and said bottom portion, whereby said second end can receive a drill chuck key in retaining relation, said drill chuck key having a longitudinal body being placed through said aperture of said top portion and said bottom portion in a manner so that said drill chuck key is positioned transversely to said strap, said drill chuck key having a handle being secured between said top and bottom portions.

15. The binding strap of claim 14 in which an inside face of each of said top portion and bottom portion has adhesive means whereby said top portion and bottom portion can be secured together in tight relationship around said drill chuck key handle.

* * * * *